July 31, 1962  L. J. PRUNIER  3,046,708
LENS SURFACING TECHNIQUE
Filed Nov. 2, 1959
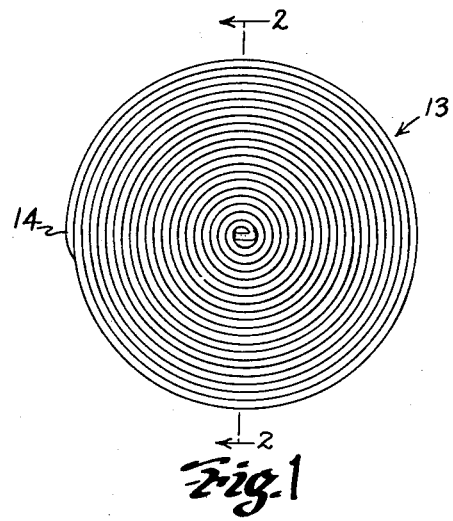
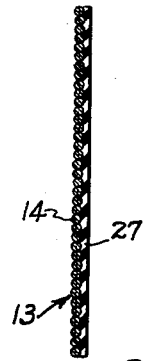
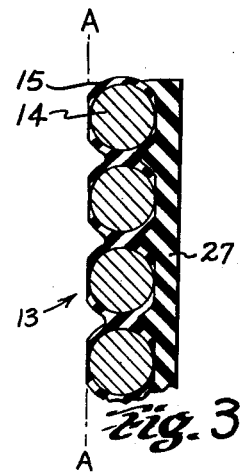
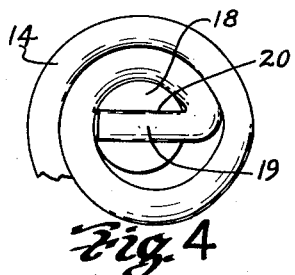
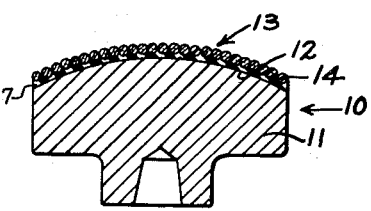
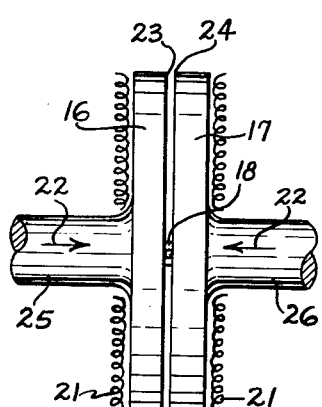
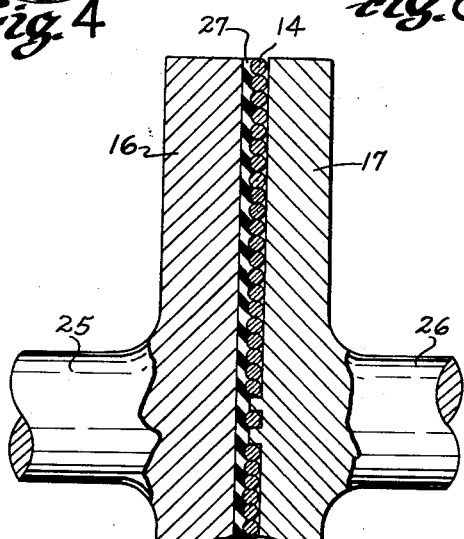
INVENTOR
LOUIS J. PRUNIER
BY
Louis L. Gagnon
ATTORNEY

United States Patent Office 3,046,708
Patented July 31, 1962

3,046,708
LENS SURFACING TECHNIQUE
Louis J. Prunier, Oxford, Mass., assignor to American Optical Company, Southbridge, Mass., a voluntary association of Massachusetts
Filed Nov. 2, 1959, Ser. No. 850,289
7 Claims. (Cl. 51—185)

This invention relates to improvements in abrading apparatus and has particular reference to the provision of an improved lens abrading tool having a replaceable surface portion and method of making the same.

It has been the usual practice throughout the years to abrade the surfaces of lens blanks for ophthalmic lenses or the like by the use of lens abrading tools having surface curvatures formed thereon which are shaped in accordance with the surface to be transferred to the lens blanks.

In most part, such tools were formed of cast iron, and during the abrading, a slurry containing abrasive particles was applied to the surface of the tools while the lens blanks were moved in irregular paths over the surfaces of the tools under controlled pressure.

It has been found from past practice that the slurry containing the abrasive particles, while causing the lens blanks to become abraded to the curved shapes of the surfaces of the tools, also caused the surfaces of the tool to wear and introduce inaccuracies of curvature.

The past practice has been to re-true the surfaces of such tools by the use of machines known in the art as lap-truing machines which, during the re-truing operation, required removal of considerable material from the face of the tool with the result that the tool soon became spent and required replacement.

In order to have such tools perform efficiently, in most instances, grooves or recesses were formed in the faces of such tools in order to retain and cause the slurry to be more evenly distributed on said face during the abrading operation. Such grooving or recessing was also time-consuming and costly as it had to be performed after each resurfacing of the tool.

The present invention is directed to overcoming all of the above-mentioned difficulties by providing a replaceable relatively thin sheet-like facing which, when applied to the surface of the tool, will accurately conform thereto and, in itself, become the effective abrading face of the tool.

A principal object of the invention, therefore, is to provide auxiliary facings for abrading tools which, when worn, may be removed and replaced, thereby causing no damage to the actual surface of the tool.

Another object is to provide a simple and efficient means and method of forming such replaceable facings, wherein slight recesses will inherently be present throughout the area thereof and will function as the aforementioned grooving and recessing and wherein the effective parts of the facings will be disposed in a single plane.

Another object is to provide novel means and method of making such replaceable facings and of attaching them to the preformed curved surfaces of conventional lens abrading tools.

Other objects and advantages will become apparent from the following description taken in connection with the accompanying drawings in which:

FIG. 1 is a top plan view of a replaceable sheet-like facing formed in accordance with the invention;

FIG. 2 is a sectional view taken as on line 2—2 of FIG. 1;

FIG. 3 is an enlarged fragmentary sectional view similar to the sectional view of FIG. 2, showing, in more detail, the structure of the facing of FIG. 1;

FIG. 4 is a fragmentary face view of a part of the apparatus used in the method of fabricating the facing;

FIG. 5 is a fragmentary side elevational view of the apparatus;

FIG. 6 is a fragmentary enlarged sectional view of the device shown in FIG. 5 illustrating the use of said apparatus;

FIG. 7 is a fragmentary enlargement of the sectional view of FIG. 6 illustrating further use of the apparatus; and FIG. 8 is a sectional view of an abrading tool formed in accordance with the invention.

Referring more particularly to the drawings in which like reference characters represent like parts throughout the several views, the device embodying the invention comprises a lens surfacing tool 10 having a body portion 11 formed of cast iron or other suitable shape-retaining material having a curved surface 12 on the exposed upper side thereof. The exposed upper surface is shaped substantially to the curvature desired to be formed on one side of a lens blank. The surface 12 has a detachable facing 13 secured thereto by a layer of adhesive 27 of the commonly known non-water soluble pressure-sensitive type or heat-sensitive type, for example, a composition of 75% rosin and 25% hydrogenated methyl ester of rosin or other adhesives having similar characteristics may be used.

The facing 13 may, if desired, be secured to the tool by clamp means or the like instead of using adhesive in a manner similar to the facing shown and described in Patent No. 2,886,923, issued May 19, 1959, to C. H. La France.

The facing 13, in the present instance, comprises a spirally wound wire 14 of soft galvanized steel or the like of a wire size of preferably .007 inch. However, it is to be understood that the wire may be formed of material such as bronze, nickel, chromium or mixtures thereof and to any desired cross-sectional size. The wire, in this particular embodiment of the invention, is initially provided with a suitable thin heat-softenable plastic coating 15, the purpose of which will be hereinafter described.

The spiral winding is accomplished by means of spaced dies 16 and 17 one of which has a lug 18 or other holding means centrally thereof. The lug is of a length slightly less than the diameter of the wire to be spirally wound and has a slot 19 formed therein. As shown in FIG. 4, the end 20 of the wire is first placed in the slot 19. The two die members 16 and 17 are then moved into spaced aligned relation with each other with the spacing being substantially equal to the diameter of the wire to be wound, as shown in FIG. 5. The dies are retained in this relation and are rotated by any suitable means in the direction desired of the winding. The rotation of the dies is continued until the desired diameter of facing is obtained, that is, until it is of sufficient area to be placed in covering relation with the surface of the tool. The dies 16 and 17 are then subjected to heat through the use of any desired heating means, such, for example, as electrical heating coils 21 supported in adjacent spaced relation with said dies 16 and 17. The heating is continued for a time interval and at a temperature only sufficient to soften the plastic coatings 15 whereupon the dies 16 and 17 are moved toward each other, as diagrammatically illustrated by the arrows 22, an amount sufficient to cause the spiral windings to become located in a single plane as indicated by the line A—A in FIG. 3, such as is controlled by the parallel relation of the facings 23 and 24 of the dies whereupon the plastic coatings will be softened and displaced by said dies, as shown in FIG. 3, to join into a homogeneous structure intermediate and about the spiral windings and upon subsequent cooling will harden and hold the said windings together.

It is to be understood that the die members 16 and 17, as shown in FIG. 5, have suitable aligned supporting shafts 25 and 26 mounted to rotate in suitable bearings, not shown, and may be rotated by any suitable means, not shown, such for example, as reduction gearings connecting said respective shafts to a drive motor or the like.

Subsequent to such spiral winding of the facing and the bonding thereof together by the plastic coatings 15, the dies are separated to permit removal of the facing and a suitable layer of pressure-sensitive or other desired adhesive 27 may thereafter be applied to one side surface thereof either by spraying or in the form of a thin wafer pressed thereon, as shown in FIGS. 2 and 3.

If desired, one of the facings 23 or 24 of the dies 16 and 17 may initially be provided with a layer of pressure-sensitive adhesive 27, as shown in FIG. 6. The wire is attached to the lug 18 and the dies then suitably spaced with each other in accordance with the diameter or size of the wire to be wound. The wire can thereafter be spirally wound between the layer of adhesive and the face of the opposed die to the diameter required of the facing. In this instance, the dies would thereafter be moved toward each other slightly in the direction shown by the arrows 22 to cause the spiral windings to assume a single plane A—A and to simultaneously cause the pressure-sensitive adhesive to ooze intimately into adhering relation with the adjacent surfaces of the spiral windings. With the above method, the wire would not, of necessity, have to be provided with the plastic coating 15 as the adhesive would, in this instance, hold the windings together and simultaneously serve to attach the facing to the tool. However, in the sectional view of FIG. 3, the pressure-sensitive adhesive is shown as being used in connection with spiral windings having the thin plastic coating 15 thereon. If such thin plastic coating is used with the latter method, only the die 17 engaging the side of the facing opposite the adhesive layer would be heated in the same manner as stated above to cause the plastic to soften and flow together about the spiral windings. The dies are then separated and the facing removed from between said dies by peeling the pressure-sensitive adhesive side off of the adjacent die. The outer side of the pressure-sensitive adhesive layer 27 may or may not be provided with a removable protective latex or other suitably treated layer 28 of paper, cloth or the like which may be removed only prior to securing the facing to the tool. If the adhesive-coated facings are to be placed in a container for purposes of storage or shipping, it would be preferable to place a protective layer 28 over the pressure-sensitive adhesive material. Such protective facings could be applied by the die members 16 and 17 by initially placing the protective layer over the adhesive, placing the assembly between the dies, as shown in FIG. 7, and then moving the dies slightly toward each other to exert a uniform pressure thereon or could be merely placed thereon by hand pressure.

In use, the facing having only the pressure-sensitive layer thereon is placed in overlying relation with the curved surface 12 of the tool and presed into intimately secured engagement therewith. This is made possible through the spiral windings which permit the facing to readily conform to the curved surface shape of the tool.

The essence of the present invention, as distinguished from the prior art, is the retaining of the spiral strands in their initial single plane relation with each other even though the facing may be altered to different curvatures. This is to avoid having slight protrusions outwardly of the arc of the curvature of the pad which establishes the radius of the curved surface to be formed on the blank and enables the forming of a more accurate curvature and desirable surface texture.

While the spiral strands have been defined above as preferably being bonded together through the use of a suitable plastic, it is to be understood that a suitable permanent setting adhesive might be used. This is accomplished by first making the spiral windings, as stated above, manually or magnetically holding them in said relation on the face of one of the dies while backing the other die away from the windings and by then spraying the windings with said permanent setting adhesive and allowing it to set and hold the windings together. The pressure-sensitive adhesive is thereafter placed over the permanent setting adhesive.

The magnetic holding is accomplished my magnetizing one of the dies 16 or 17.

From the foregoing description, it will be seen that simple, efficient and novel means and method have been provided for producing an abrading tool having a removable facing. It is also apparent that many changes in the details of construction, arrangement of parts and steps of the method may be made without departing from the spirit of the invention as expressed in the accompanying claims and the matter sets forth herein are, therefore, to be interpreted as illustrative and not in a limiting sense.

Having described my invention, I claim:

1. A replaceable facing for the surface of a lens abrading tool comprising a sheetlike member embodying a strand of wire of a controlled circular cross-sectional diameter spirally wound in an initially single plane and to an area sufficient to cover the area of the surface of the tool, means for securing said windings in said initial single plane to form a unitary structure which may be handled as such and means for removably securing said facing in intimate conforming relation with the surface of the tool when placed thereon with said facing being self-conforming to the shape of said surface of the tool.

2. A replaceable facing for the surface of a lens abrading tool comprising a sheetlike member embodying a very fine strand of metallic wire of a controlled circular cross-sectional diameter spirally wound in an initially single plane and to an area sufficient to cover the area of the surface of the tool, means for securing said windings in said initial single plane in a sheet-like form which may be handled as such and means in the form of a layer of pressure sensitive adhesive carried by said facing for removably securing said facing in intimate conforming relation with the surface of the tool when placed thereon with said facing being self-conforming to the shape of said surface of the tool.

3. A replaceable facing for the surface of a lens abrading tool comprising a very fine wire of a controlled circular cross-sectional diameter arranged with sections thereof in parallel non-overlapping side by side relation with each other initially in a single plane and of sufficient area and shape as to cover the major portion of the surface of the tool, plastic means securing said sections in said side by side relation in such manner as to produce a unitary bonded sheet-like facing member which may be handled as such and a layer of pressure sensitive adhesive overlying said plastic means for removably securing said facing to said tool.

4. A replaceable facing for the surface of a lens abrading tool comprising a very fine wire of a controlled circular cross-sectional diameter arranged with sections thereof in parallel non-overlapping side by side relation with each other initially in a single plane and of sufficient area as to cover the major portion of the surface of the tool, permanent setting adhesive securing said sections in said side by side relation in such manner as to produce a unitary bonded sheet-like facing member which may be handled as such and a layer of pressure sensitive adhesive overlying said permanent setting adhesive for removably securing said facing to said tool.

5. A lens surfacing tool comprising a body portion having one side thereof provided with a surface shaped to the surface shape desired to be formed on a lens blank by said tool, a facing overlying and detachably secured to said surface of said tool and in intimate contact therewith, said facing comprising a wire of a controlled circular cross-sectional diameter arranged with sections thereof in parallel non-overlapping side by side relation with each other initially in a single plane and of such area and shape as to cover the major portion of the surface of the tool, means securing said sections in said side-by-side relation and in such manner as to produce a unitary bonded sheet-like facing which may be handled as a separate unit and means removably intimately securing said facing to the surface of the tool throughout the area of said facing, said sections permitting said facing to conform to the shape of the surface of the tool without altering the initial side by side relation of said sections.

6. A relatively thin sheet-like replaceable facing for the surface of an abrading tool comprising a metallic wire of approximately .007 inch in diameter arranged with sections thereof in parallel non-overlapping side-by-side relation with each other initially in a single plane and of such an area as to cover the major portion of the surface of the abrading tool, means for securing said sections in said side-by-side relation in such a manner as to produce a unitary bonded sheet-like facing member which may be handled as such and means for removably retaining said facing in substantially conforming relation with the surface of the tool when placed thereon with said sheet-like facing member being self-conforming to the shape of said surface of the tool.

7. A relatively thin sheet-like replaceable facing for the surface of an abrading tool comprising a wire of controlled small cross-sectional diameter arranged with sections thereof in parallel non-overlapping side-by-side relation with each other initially in a single plane and of such area as to cover the major portion of the surface of the abrading tool, means for securing said sections in said side-by-side relation in such manner as to produce a unitary bonded sheet-like facing member which may be handled as such and means for removably retaining said facing in substantially conforming relation with the surface of the tool when placed thereon with said sheet-like facing member being self-conforming to the shape of said surface of the tool.

References Cited in the file of this patent

UNITED STATES PATENTS

| | | |
|---|---|---|
| 1,792,800 | Birgbauer | Feb. 17, 1931 |
| 2,076,846 | Johanson | Apr. 13, 1937 |
| 2,226,506 | Van Der Pyl | Dec. 24, 1940 |
| 2,886,923 | La France | May 19, 1959 |